(12) United States Patent
Sparks

(10) Patent No.: US 11,593,395 B2
(45) Date of Patent: Feb. 28, 2023

(54) ENVIRONMENTAL LIFECYCLE DATA MANAGEMENT SYSTEM

(71) Applicant: Trimble Inc., Sunnyvale, CA (US)

(72) Inventor: Devon Sparks, Portland, OR (US)

(73) Assignee: Trimble Inc., Sunnyvale, CA (US)

( * ) Notice: Subject to any disclaimer, the term of this patent is extended or adjusted under 35 U.S.C. 154(b) by 246 days.

(21) Appl. No.: 15/950,578

(22) Filed: Apr. 11, 2018

(65) Prior Publication Data

US 2019/0318018 A1 Oct. 17, 2019

(51) Int. Cl.
*G06F 16/27* (2019.01)
*G06F 21/62* (2013.01)
*G06F 21/60* (2013.01)
*G06F 16/22* (2019.01)

(52) U.S. Cl.
CPC .......... *G06F 16/27* (2019.01); *G06F 16/2282* (2019.01); *G06F 21/602* (2013.01); *G06F 21/6227* (2013.01); *G06F 2221/2107* (2013.01)

(58) Field of Classification Search
CPC ..................................................... G06F 16/27
USPC ....................................................... 707/741
See application file for complete search history.

(56) References Cited

U.S. PATENT DOCUMENTS

| | | | |
|---|---|---|---|
| 6,954,796 B2 * | 10/2005 | Tan ................... | H04L 29/06027 709/231 |
| 2002/0194149 A1 * | 12/2002 | Gerber ................. | G06F 16/284 |
| 2005/0096124 A1 * | 5/2005 | Stronach ............ | G07F 17/3288 463/25 |
| 2008/0016107 A1 * | 1/2008 | Worrall ................ | G06F 3/0638 |
| 2010/0150024 A1 * | 6/2010 | Juttner .................... | H04L 45/02 370/254 |
| 2012/0163590 A1 * | 6/2012 | Lieber ................... | H04L 9/3066 380/44 |
| 2012/0254249 A1 * | 10/2012 | Starkey .................. | G06F 16/27 707/792 |
| 2013/0177157 A1 * | 7/2013 | Li ........................... | H04L 9/085 380/277 |
| 2014/0348170 A1 * | 11/2014 | An ........................ | H04L 45/124 370/392 |
| 2019/0305948 A1 * | 10/2019 | Barbas ................ | G06F 21/6227 |

* cited by examiner

*Primary Examiner* — Muluemebet Gurmu
(74) *Attorney, Agent, or Firm* — Kilpatrick Townsend & Stockton

(57) ABSTRACT

A distributed database comprising a plurality of interconnected nodes. Each node may include an external interface configured to receive a data element from a data source external to the distributed database. The data element may include one or more data fragments. Each of the one or more data fragments may be linked to a single aspect of a plurality of aspects. The external interface may also be configured to divide the data element into the one or more data fragments. Each node may also include a local database configured to store the one or more data fragments. Each node may further include an internal interface configured to send the one or more data fragments to a destination node within the distributed database.

14 Claims, 14 Drawing Sheets

| FragmentID | ElementID | Rank | Expiration | AspectID | Encrypted Data | Node | Timestamp | Decrypted? | Forwarded? |
|---|---|---|---|---|---|---|---|---|---|
| String: UUID of fragment (used for loop detection) | String: UUID of Element | Integer: Number of Aspects on Element | UTC timestamp: When fragment becomes stale (and may be detected) | String: hierarchical path | String: data payload | String: UUID of producing client | UTC timestamp: When fragment was created | Bool: Has the fragment been reconstructed? | Bool: Has the fragment been forwarded? |
| zDjc | Urh2 | 2 | 152193600 | /Sys/MEP | http://bit.ly... | N1 | 152158989 | True | True |
| IaPd | Urh2 | 2 | 152193600 | /Zone/East | 45.6, 34.5 | N1 | 152158989 | True | True |
| Bsfi | HiBg | 3 | 152195000 | /Cost | dhrnap4i... | | | False | True |

Fragment Table 114-1

FIG. 10

ENVIRONMENTAL LIFECYCLE DATA MANAGEMENT SYSTEM

BACKGROUND

In a distributed database, multiple computers (i.e., nodes) communicate information with each other without sharing physical components such as processors, memory devices, etc. The computers may be located in the same physical location (e.g., in the same server room) or they may be dispersed across different geographic locations. One advantage of distributed databases is that performance for end users is improved by allowing transactions to be processed on many machines, instead of being limited to a single machine. Another advantage is that distributed databases may be easily expanded with additional computers, and computers that are currently connected to the distributed database may be easily replaced due to, e.g., a hardware failure or routine maintenance.

Despite these advantages, distributed databases have several drawbacks. For example, a simple data retrieval request made by an end user may cause significantly more computations than a similar request made to a centralized database due to the increased complexity of finding a particular piece of data within the distributed database and moving the data across multiple nodes. Another drawback of distributed databases is the increased vulnerability to security threats. For example, the movement of data across multiple communication links between nodes increases the number of opportunities for a data breach. Accordingly, new systems, methods, and other techniques for improving distributed databases are needed.

SUMMARY

In a first aspect of the present invention, a distributed database is provided. The distributed database may include a plurality of nodes. In some embodiments, each node of the plurality of nodes may include an external interface configured to receive a data element from a data source external to the distributed database. In some embodiments, the data element includes one or more data fragments. In some embodiments, each of the one or more data fragments is linked to a single aspect of a plurality of aspects. The external interface may be also configured to divide the data element into the one or more data fragments. Each node may also include a local database configured to store the one or more data fragments. Each node may further include an internal interface configured to send the one or more data fragments to a destination node of the plurality of nodes. In some embodiments, the internal interface is further configured to receive one or more encrypted data fragments from a source node of the plurality of nodes. In some embodiments, the local database is further configured to store the one or more encrypted data fragments.

In a second aspect of the present invention, a node within a distributed database is provided. The node may include an external interface configured to receive a data element from a data source external to the distributed database. In some embodiments, the data element includes one or more data fragments. In some embodiments, each of the one or more data fragments is linked to a single aspect of a plurality of aspects. The external interface may also be configured to divide the data element into the one or more data fragments. The node may also include a local database configured to store the one or more data fragments. The node may further include an internal interface configured to send the one or more data fragments to a destination node within the distributed database.

In some embodiments, each of the plurality of aspects is either a parent aspect or a nested aspect, where a particular nested aspect includes a greater level of specificity than a corresponding parent aspect. In some embodiments, the external interface is further configured to encrypt the one or more data fragments to generate one or more encrypted data fragments such that decryption of the one or more encrypted data fragments can only be performed using all of the one or more encrypted data fragments and not a subset of the one or more encrypted data fragments. In some embodiments, the local database is further configured to store the one or more encrypted data fragments. In some embodiments, the internal interface is configured to send the one or more encrypted data fragments to the destination node.

In some embodiments, the internal interface is further configured to encrypt the one or more data fragments to generate one or more encrypted data fragments such that decryption of the one or more encrypted data fragments can only be performed using all of the one or more encrypted data fragments but cannot be performed using a subset of the one or more encrypted data fragments. In some embodiments, the internal interface is further configured to send the one or more encrypted data fragments to the destination node. In some embodiments, the internal interface is further configured to receive one or more encrypted data fragments from a source node within the distributed database. In some embodiments, the local database is further configured to store the one or more encrypted data fragments.

In some embodiments, the local database is further configured to periodically determine whether all of the one or more encrypted data fragments have been stored and in response to determining that all of the one or more encrypted data fragments have been stored, decrypting the one or more encrypted data fragments. In some embodiments, the local database includes a fragment table for storing the one or more data fragments and a forwarding table containing information for identifying the destination node based on the plurality of aspects. In some embodiments, the data source is one or more of a user, a device, and a software process. In some embodiments, the external interface and the internal interface utilize a same processor.

In a third aspect of the present invention, a method of processing data within a distributed database is provided. The method may include receiving, by an external interface of a node within the distributed database, a data element from a data source external to the distributed database. The method may also include dividing, by the external interface, the data element into the one or more data fragments. The method may further include storing, by a local database of the node, the one or more data fragments. The method may also include sending, by an internal interface of the node, the one or more data fragments to a destination node within the distributed database. In some embodiments, the method may include encrypting, by the external interface, the one or more data fragments to generate one or more encrypted data fragments such that decryption of the one or more encrypted data fragments can only be performed using all of the one or more encrypted data fragments and not a subset of the one or more encrypted data fragments.

In some embodiments, the method may include storing, by the local database, the one or more encrypted data fragments and sending, by the internal interface, the one or more encrypted data fragments to the destination node. In some embodiments, the method may include encrypting, by the internal interface, the one or more data fragments to generate one or more encrypted data fragments such that decryption of the one or more encrypted data fragments can only be performed using all of the one or more encrypted data fragments but cannot be performed using a subset of the one or more encrypted data fragments. In some embodiments, the method may include sending, by the internal interface, the one or more encrypted data fragments to the destination node. In some embodiments, the method may include receiving, by the internal interface, one or more encrypted data fragments from a source node within the distributed database and storing, by the local database, the one or more encrypted data fragments. In some embodiments, the method may include periodically determining, by the local database, whether all of the one or more encrypted data fragments have been stored and in response to determining that all of the one or more encrypted data fragments have been stored, decrypting, by the local database, the one or more encrypted data fragments.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 10 illustrates an example of a fragment table, according to some embodiments of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Environmental lifecycle databases must store and distribute huge numbers of objects corresponding to the geometries of buildings, materials, and other items, sensor readings, maintenance records, design specifications, project schedules, cost rollups, and the like. Such databases can have thousands of individual users, application instances, and devices attempting to access information simultaneously. A single centralized database for all data and clients has proven to be insufficient for accommodating the amount of data that must be stored and the number of end users attempting to access. Furthermore, an environmental lifecycle database needs to archive, integrate, and expose data from thousands of distinct clients, whose participation, organization, and network connectivity is dynamic. Embodiments of the present invention allow efficient storage of environmental lifecycle data using a decentralized, network-based approach as described below.

Embodiments of the present invention relate to systems and methods for storing, organizing, receiving, distributing, and/or processing data within a distributed database based on a data element's properties (aspects). Information may be stored within the distributed database utilizing a data model in which data elements are considered to be linked to one or more predefined aspects. Alternatively or additionally, each data element is comprised of data fragments, each of which are considered to be linked to a single aspect of the predefined aspects. Nodes within the distributed database share data elements by forwarding (encrypted) data fragments across the network. Data fragments are forwarded based on forwarding rules, which are based on aspects. For example, nodes may subscribe to different aspects, and the forwarding rules for all nodes may be updated to reflect which nodes are subscribed to which aspects. In some instances, permission must first be obtained prior to updating forwarding rules for certain nodes and for certain aspects. Because only those nodes that receive all fragments are able to reconstruct the corresponding data element, the efficiency and security of the distributed database of the present invention is greatly increased compared to conventional techniques.

Figure 1A:
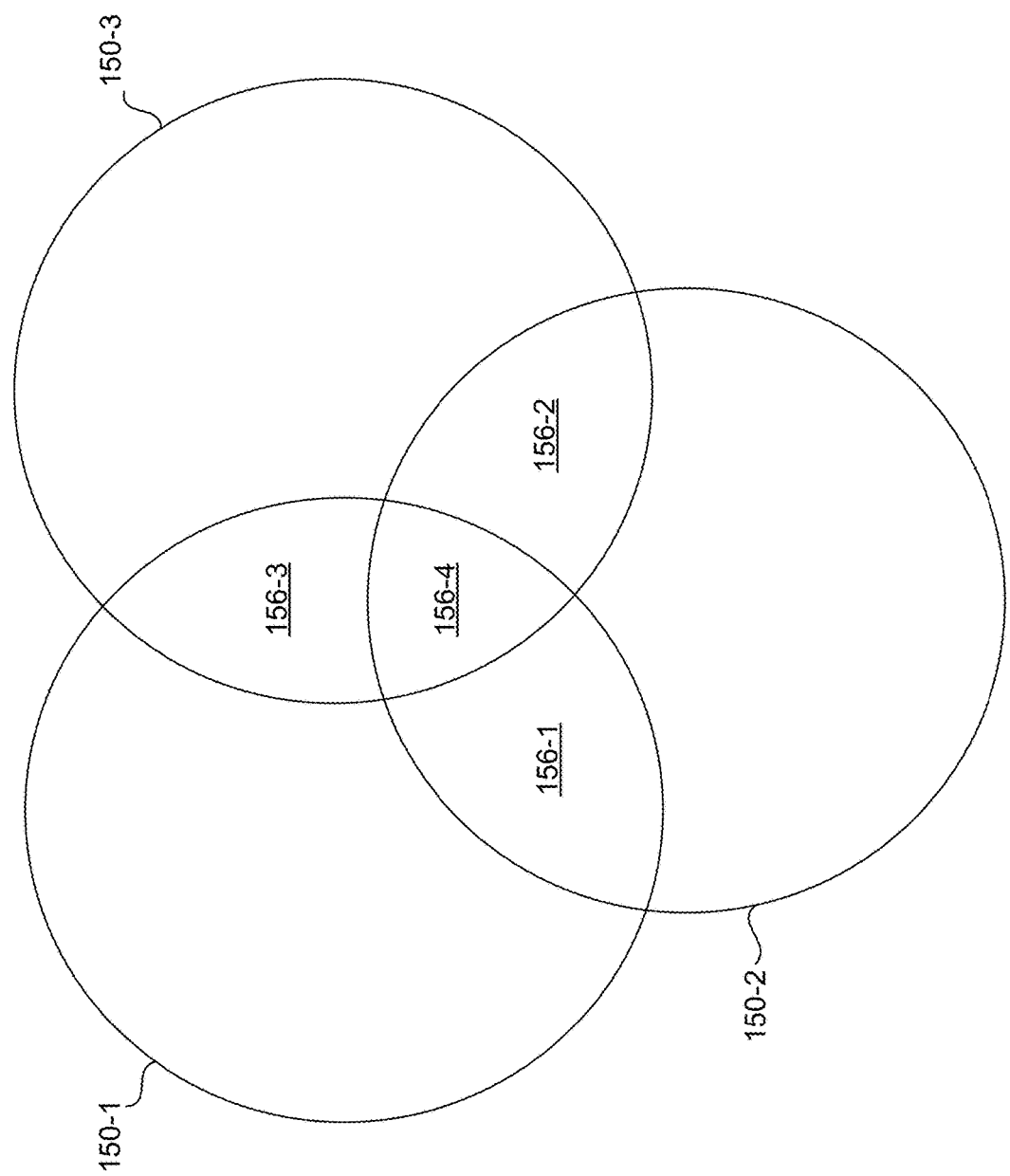
FIGS. 1A and 1B illustrate a data model for processing data within a distributed database, according to some embodiments of the present disclosure.
Figure 1B:
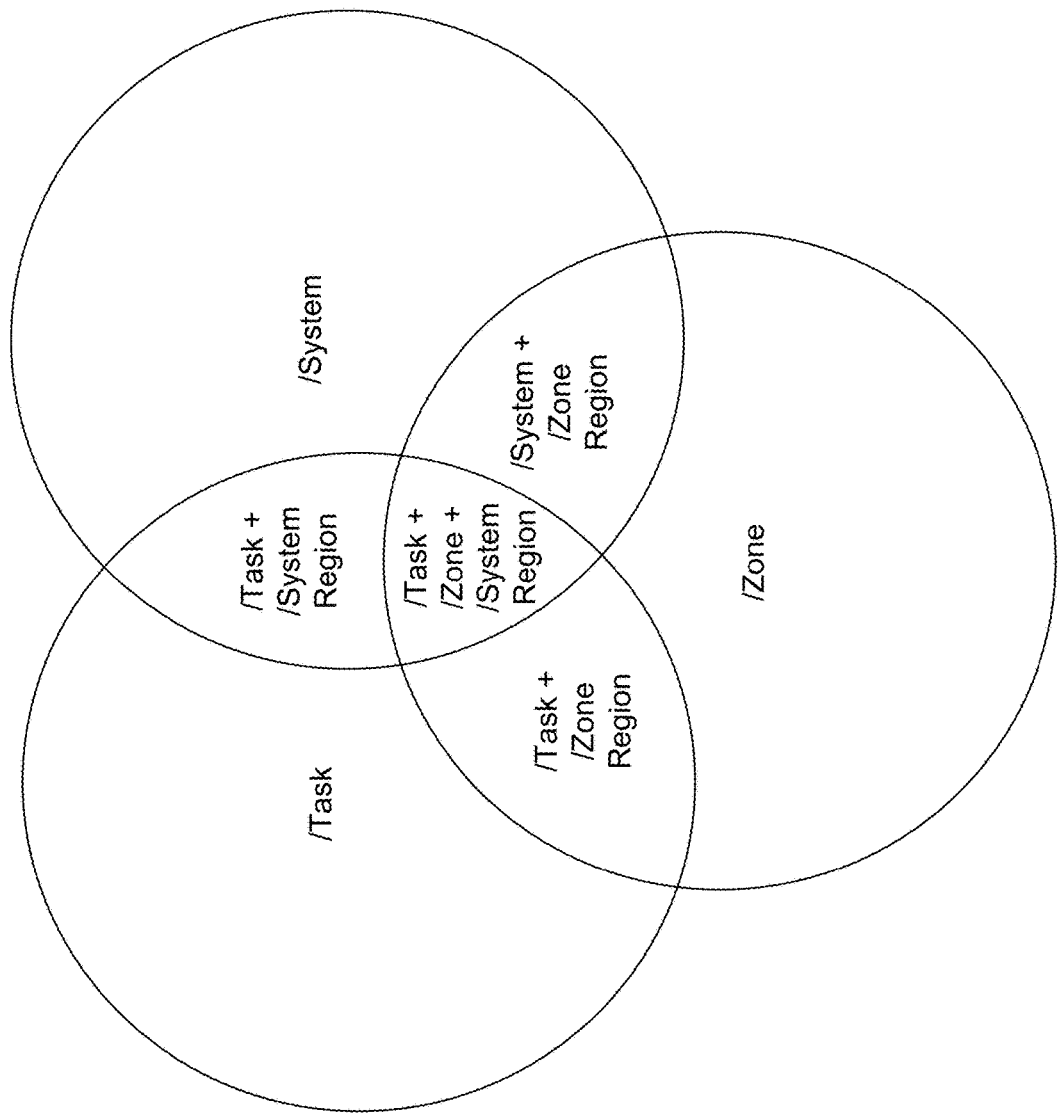

FIGS. 1A and 1B illustrate a data model for processing data within a distributed database 100, according to some embodiments of the present disclosure. Data in distributed database 100 is organized within the framework of aspects 150, which may include a collection of overlapping aspects 150. Each of aspects 150 may represent a single property or facet of the data (e.g., task structure, system component, zone). In some instances, aspects 150 may be used to classify data into types, classification structures (e.g., omniclass, uniclass), breakdown structures (e.g., work breakdown, location breakdown, product breakdown structure), and nested properties with units (e.g., /Cost/USD). The intersection of one or more aspects 150 is called a region 156. For example, referring to FIG. 1A, region 156-1 represents the intersection between aspects 150-1 and 150-2, region 156-2 represents the intersection between aspects 150-2 and 150-3, region 156-3 represents the intersection between aspects 150-1 and 150-3, and region 156-4 represents the intersection between aspects 150-1, 150-2, and 150-3. An example of one possible set of aspects 150 and regions 156 is shown in FIG. 1B.

Figure 2:
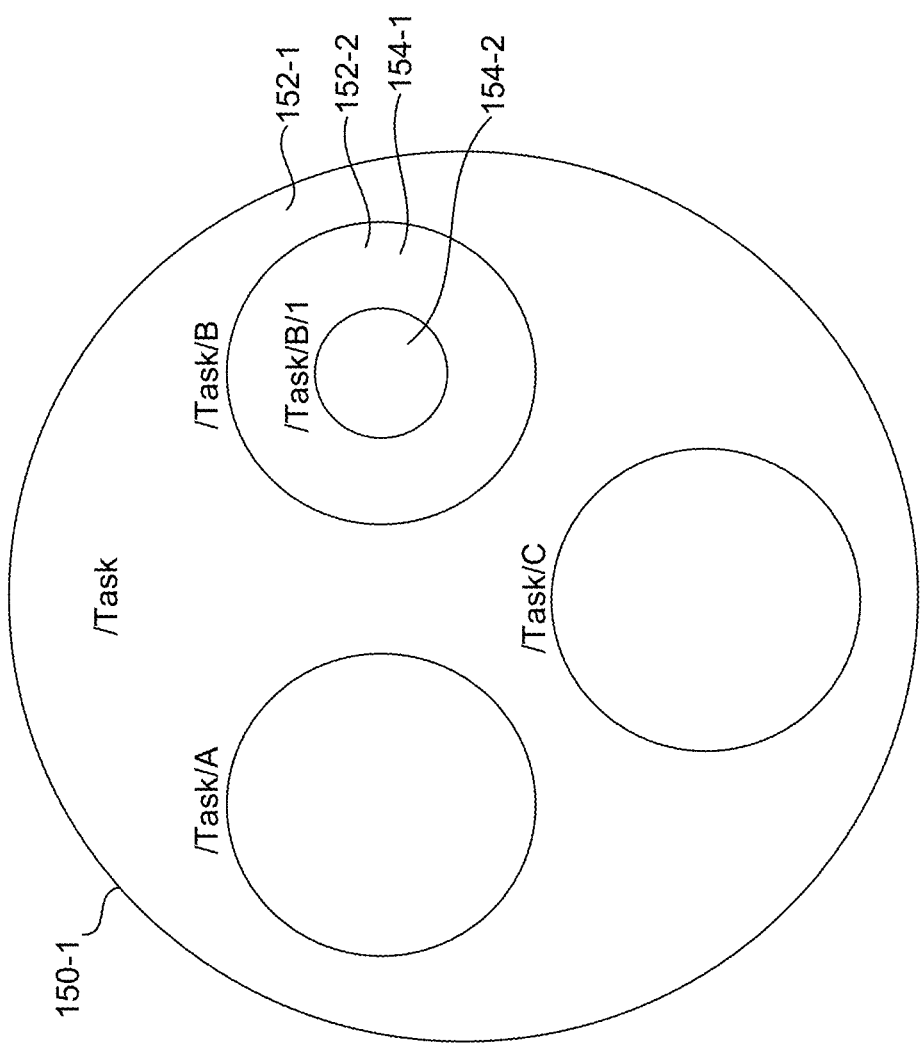
FIG. 2 illustrates an aspect of a data model along with example subaspects, according to some embodiments of the present disclosure.

FIG. 2 illustrates various nested aspects contained in aspect 150-1, according to some embodiments of the present disclosure. As shown in FIG. 2, aspect 150-1 may include one or more parent aspects 152 and one or more nested aspects 154. In some embodiments, a particular nested aspect 154 may be identified by its successive parent aspects, separated by a delimiter (e.g., a forward slash). For example, nested aspect 154-2 may be identified by its parents aspects 152-1 and 152-2 (/Task/B/1), and nested aspect 154-1 may be identified by its parent aspect 152-1 (/Task/B). Nodes that are subscribed to a particular parent aspect 152 may automatically be subscribed to the corresponding nested aspects 154. In other words, nodes that are recipients of a particular parent aspect 152 in the forwarding table will receive forwards on their nested aspects 154.

Figure 3:
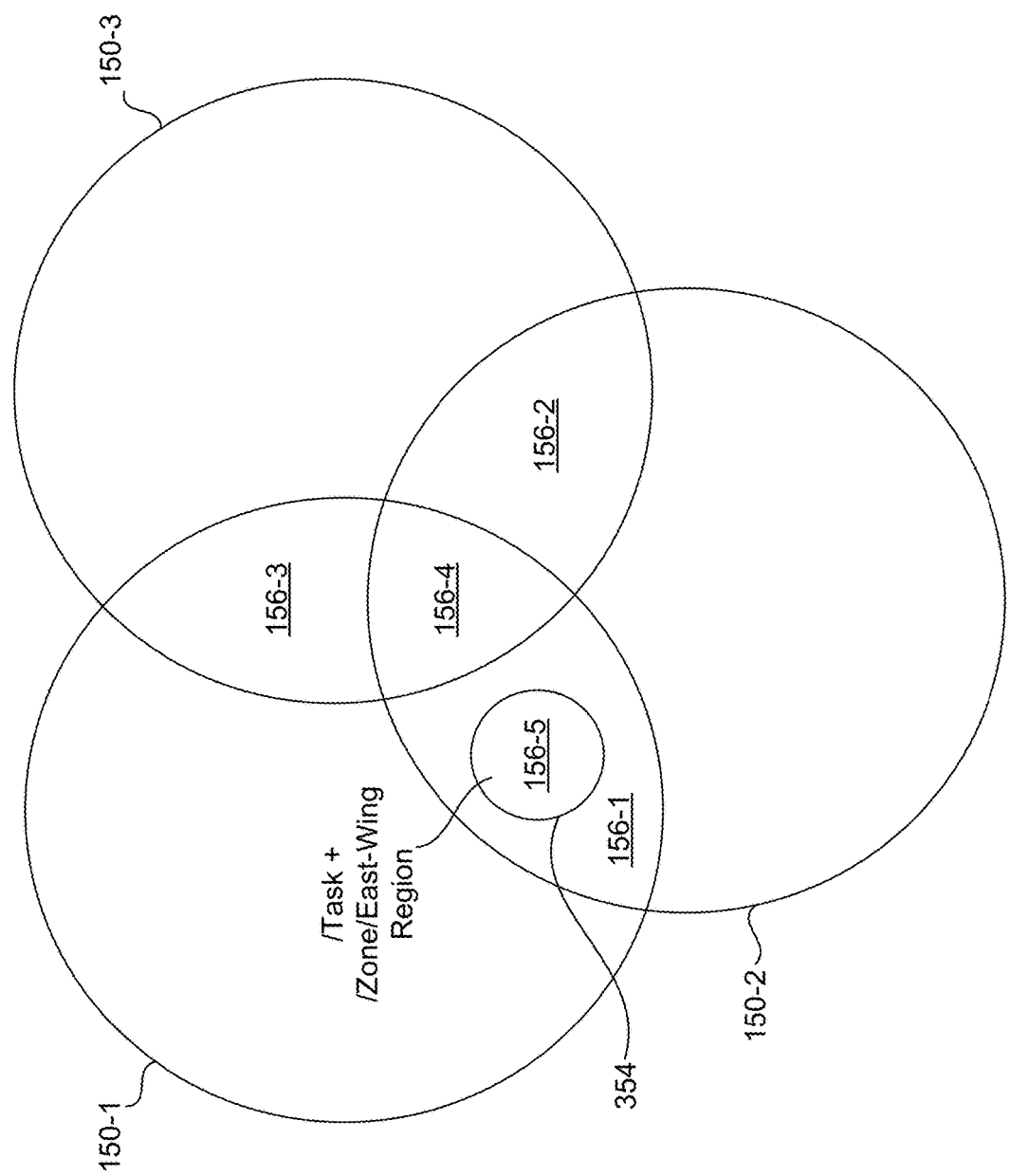
FIG. 3 illustrates a data model with various regions formed by overlapping aspects, according to some embodiments of the present disclosure.

FIG. 3 illustrates the data model with various regions formed by overlapping aspects 150, according to some embodiments of the present disclosure. As shown in FIG. 3, region 156-5 represents the intersection between aspect 150-1 (/Task) and a nested aspect 354 of aspect 150-2 (/Zone/East-Wing).

Figure 4:
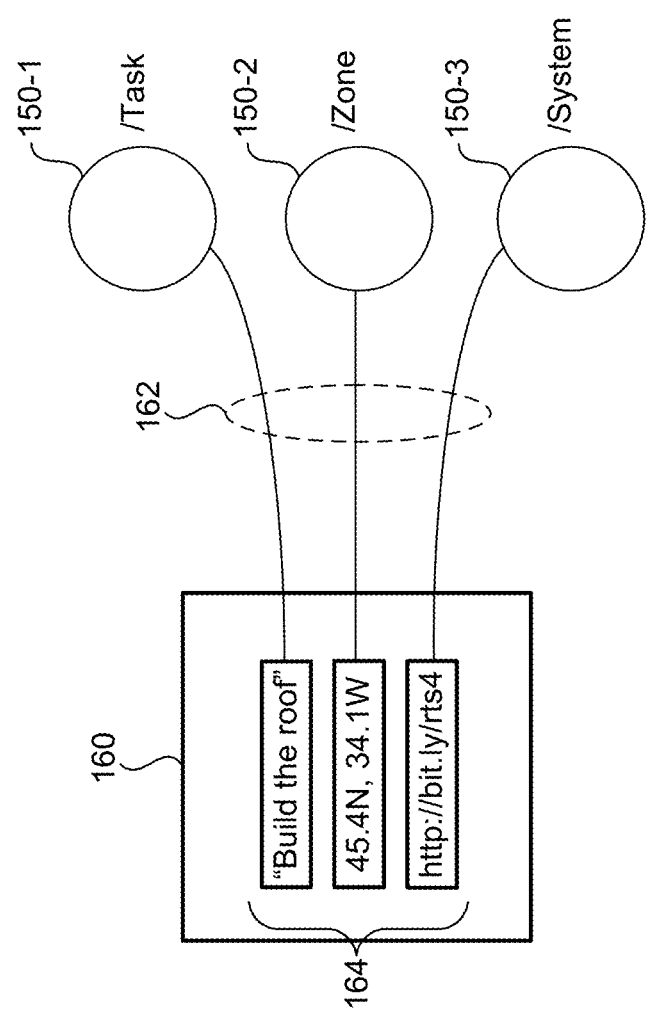
FIG. 4 illustrates a data element having various links to aspects, according to some embodiments of the present disclosure.

FIG. 4 illustrates a data element 160 having various links 162 to aspects 150, according to some embodiments of the present disclosure. According to the data model of the present invention, data element 160 may include one or more data fragments 164, each of which is linked to one of aspects 150 (which may correspond to a parent aspect 152 and/or a nested aspect 154). In some embodiments, data element 160 includes tag data identifying each of links 162 such that processing of data element 160 may allow identification of each of aspects 150.

Figure 5:
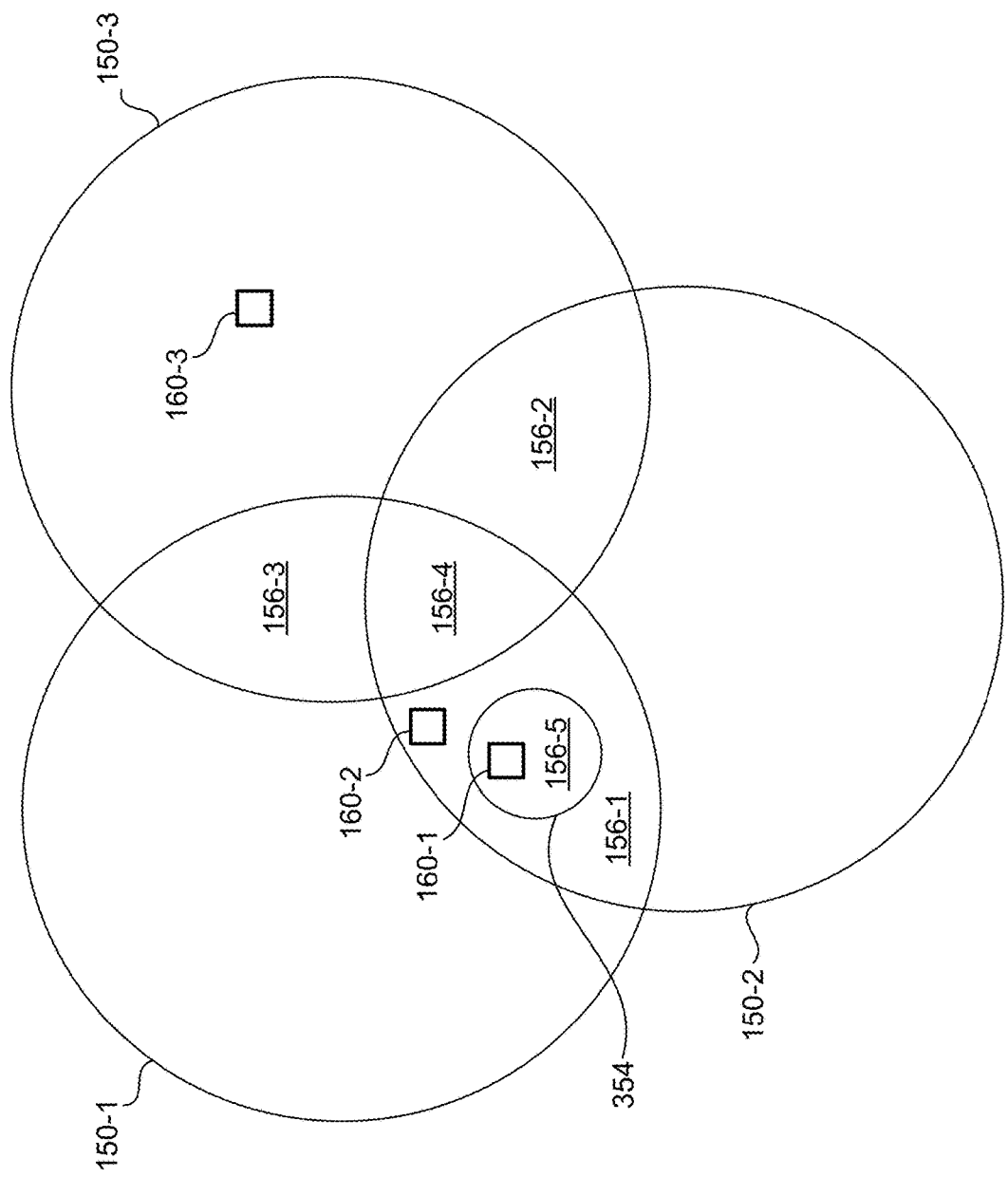
FIG. 5 illustrates possible placements of data elements within the data model, according to some embodiments of the present disclosure.

FIG. 5 illustrates possible placements of data elements 160 within the data model, according to some embodiments of the present disclosure. As shown in FIG. 5, data element 160-1 may be placed within region 156-5 such that data element 160-1 (i.e., data fragments 164 within data element 160-1) is linked to aspect 150-1 (/Task) and nested aspect 354 of aspect 150-2 (/Zone/East-Wing), data element 160-2 may be placed within region 156-1 such that data element 160-2 (i.e., data fragments 164 within data element 160-2) is linked to aspect 150-1 (/Task) and aspect 150-2 (/Zone), and data element 160-3 may be placed within aspect 150-3 such that data element 160-3 (i.e., data fragments 164 within data element 160-3) is linked to aspect 150-3 (/System). In some embodiments, a data element that belongs to a nested aspect also belongs to all of the parents of the nested aspect. For example, because data element 160-1 is a /Task+/Zone/East-Wing data element, it is also a /Task+/Zone data element. Accordingly, a node listed to receive aspect /Task and aspect /Zone in some other node's forwarding table will also receive data element 160-1.

Figure 6:
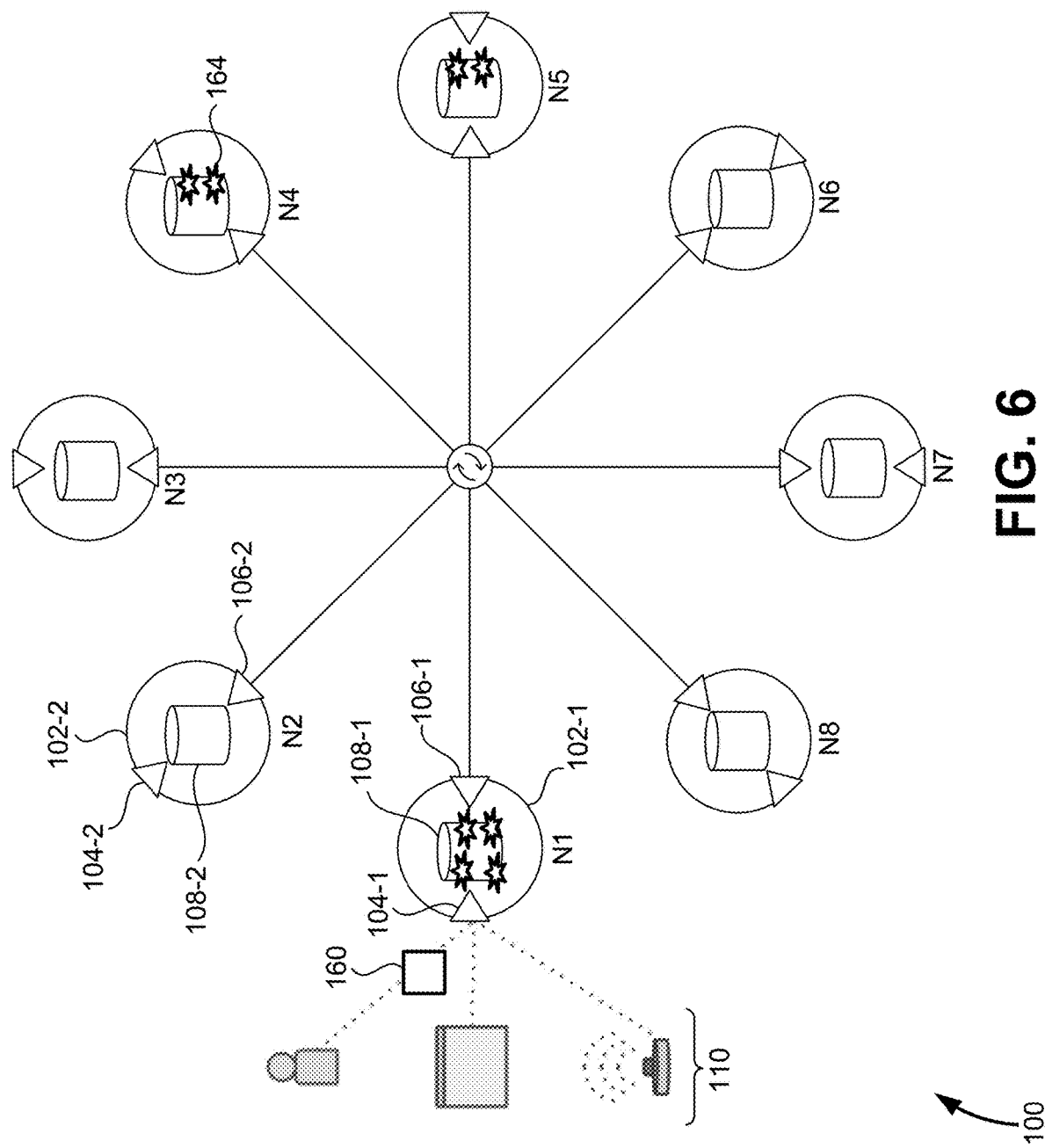
FIG. 6 illustrates a block diagram of a distributed database, according to some embodiments of the present disclosure.

FIG. 6 illustrates a block diagram of distributed database 100, according to some embodiments of the present disclosure. Distributed database 100 may include a plurality of interconnected nodes 102 (i.e., endpoints) that are each capable of storing data independent of each other. Each of nodes 102 has a globally unique ID (e.g., "N1", "N2", "N3", etc.), a local database 108 for received and produced environmental lifecycle data, and a list of other nodes to which data can be forwarded to based on the content of the data.

In some embodiments, each of nodes 102 may include an external interface 104 for providing access to one or more accessing entities 110. In some embodiments, accessing entities 110 may include users, applications, and/or devices. Accessing entities 110 may upload or retrieve data element 160 from node 102, often concurrently, using external interface 104. In some embodiments, external interface 104 may include a local API for querying and committing data elements 160. In some embodiments, each of nodes 102 may include a local database 108 for storing and maintaining data fragments 164. In some embodiments, each of nodes 102 may also include an internal interface 106 for sending and receiving encrypted fragments 164 from other nodes 102 within distributed database 100.

Figure 7:
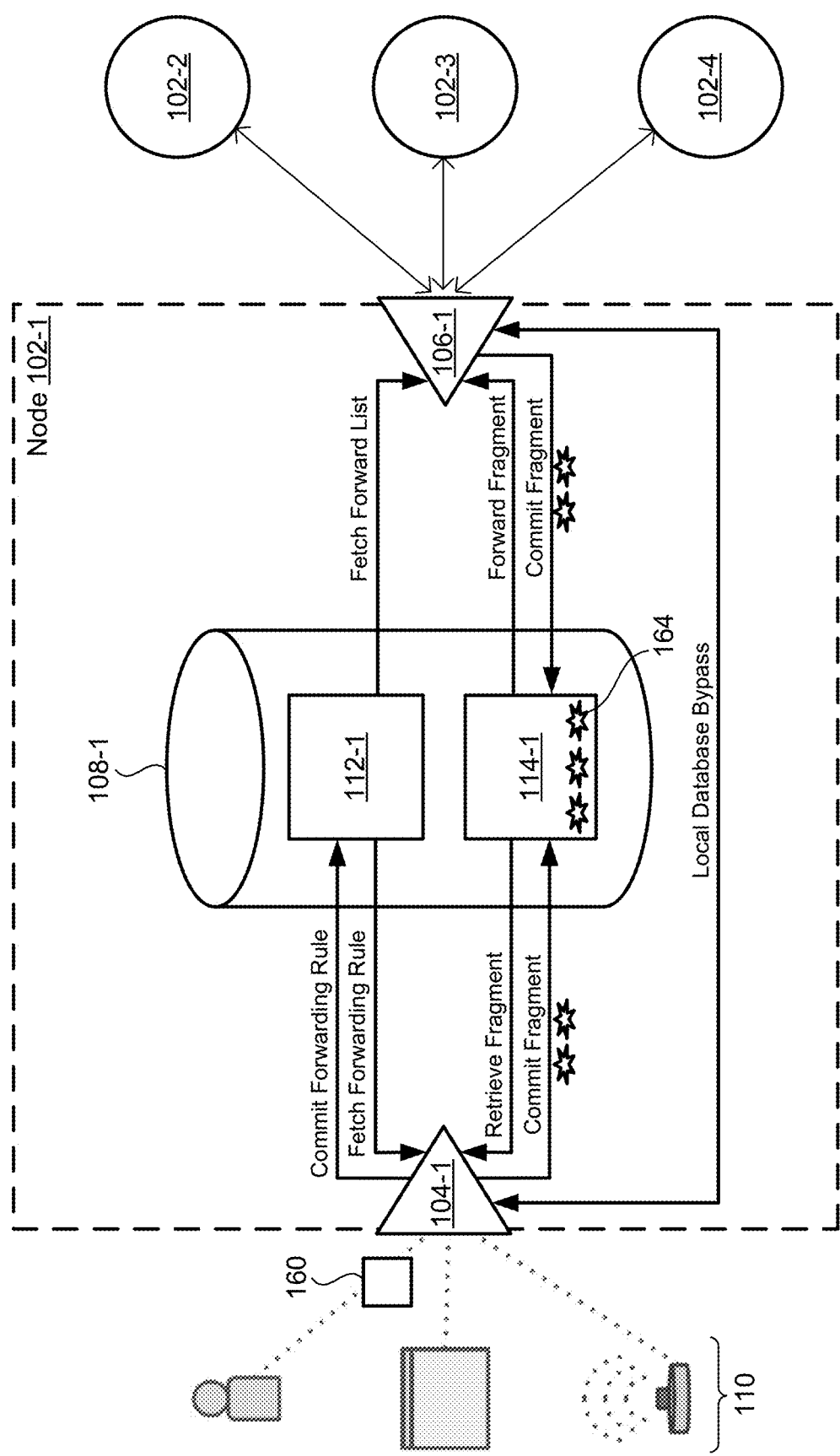
FIG. 7 illustrates a block diagram of a node, according to some embodiments of the present disclosure.

FIG. 7 illustrates a block diagram of node 102-1, according to some embodiments of the present disclosure. When data element 160 is committed using external interface 104-1, it is broken into a series of fragments 164 and stored in a fragment table 114-1. Fragments 164 are generally decrypted by external interface 104-1 prior to storage in fragment table 114-1, although other embodiments are possible. In some embodiments, accessing entities 110 may request retrieval of data element 160 from node 102-1, which may cause one or more of fragments 164 stored in fragment table 114-1 corresponding to data element 160 to be retrieved. External interface 104-1 may construct data element 160 using fragments 164 and may, in some embodiments, decrypt fragments 164. In other embodiments, or in the same embodiments, fragments 164 may be stored in fragment table 114-1 already decrypted.

Using external interface 104-1, accessing entities 110 may request retrieval of data element 160 using an ElementID (as described in reference to FIG. 10) or using partial or exact match on aspects. For example, referring to FIG. 5, data element 160-1 could be retrieved by requesting any combination of aspects 150-1, 150-2, 150-3, or 354 (or their parents in the case of a partial match). Any request that included aspects 150-1, 150-2, 150-3, or 354 (or their parents) and a disjoint aspect would not return data element 160-1 because data element 160-1 does not contain that aspect.

External interface 104-1 may also be used by accessing entities 110 to fetch the current forwarding rules stored in a forwarding table 112-1, and to update or replace the current forwarding rules with new forwarding rules. For example, new forwarding rules may be added to one or more of nodes 102 each time a new node is added to distributed database 100. Furthermore, when one or more of nodes 102 is removed from distributed database 100, the forwarding rules of the remaining nodes may be updated to delete the removed nodes from any current forwarding rules. Forwarding rules may also be updated each time one of nodes 102 subscribes to a new aspect 150.

Internal interface 106-1 may receive encrypted fragments 164 from other nodes 102 within distributed database 100 (e.g., nodes 102-2, 102-3, and 102-4) and store them in fragment table 114-1. Internal interface 106-1 may also send encrypted fragments 164 to other nodes within distributed database 100 by, first, fetching the current forwarding rules from forwarding table 112-1 and, second, retrieving and forwarding the fragments 164 identified in the current forwarding rules. In some embodiments, encrypted fragments 164 may be transmitted directly between external interface 104-1 and internal interface 106-1 using a local database bypass.

Figure 8:
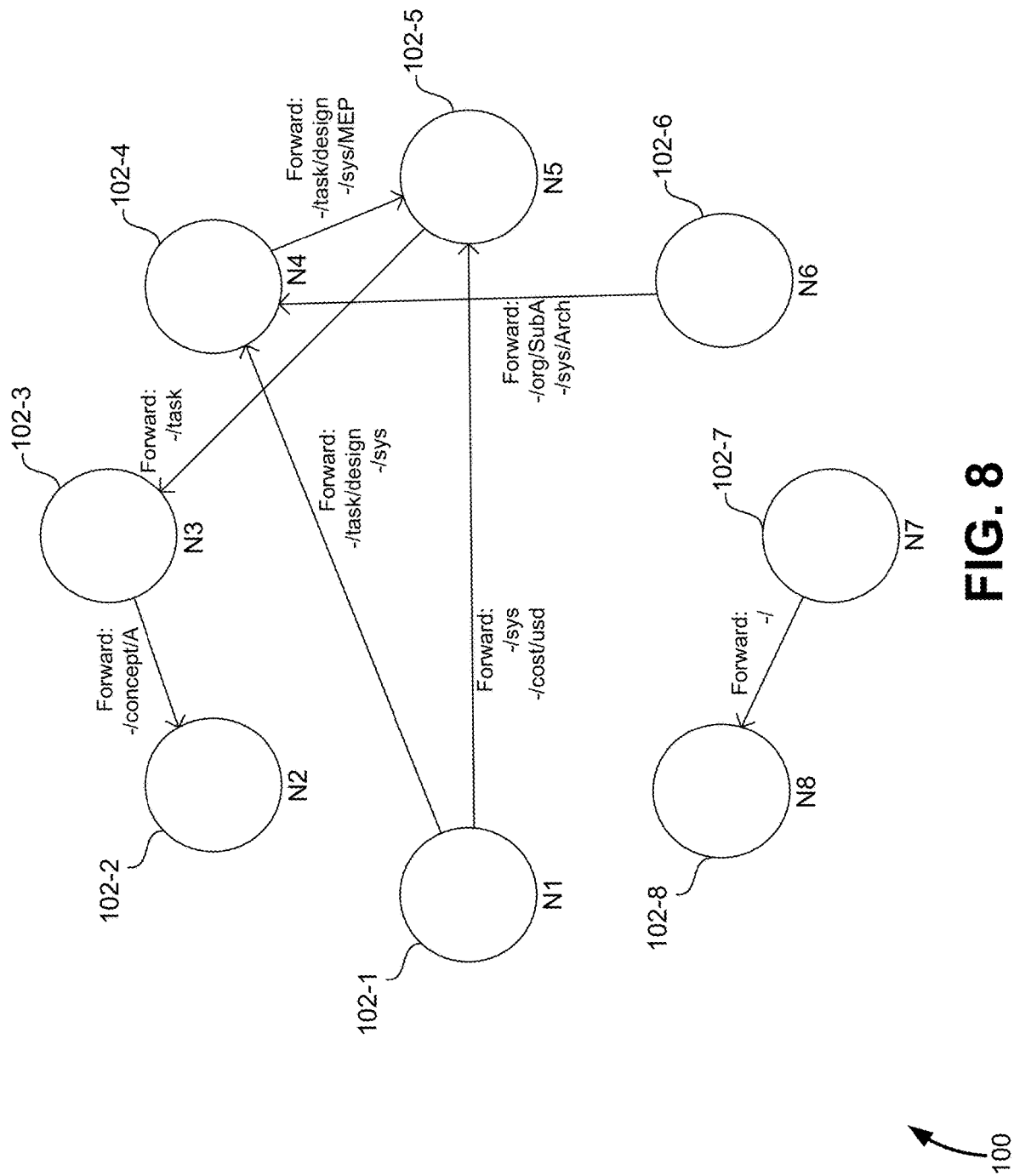
FIG. 8 illustrates an example of various forwarding rules between nodes of a distributed database, according to some embodiments of the present disclosure.

FIG. 8 illustrates an example of various forwarding rules between nodes 102 of distributed database 100, according to some embodiments of the present disclosure. In the example shown, all fragments 164 stored in node 102-1 with a link to aspect /task/design or a link to aspect /sys are forwarded to node 102-4, all fragments 164 stored in node 102-1 with a link to aspect /sys or a link to aspect /cost/usd are forwarded to node 102-5, all fragments 164 stored in node 102-3 with a link to aspect /concept/A are forwarded to node 102-2, all fragments 164 stored in node 102-4 with a link to aspect /task/design or a link to aspect /sys/MEP are forwarded to node 102-5, all fragments 164 stored in node 102-5 with a link to aspect /task are forwarded to node 102-3, all fragments 164 stored in node 102-6 with a link to aspect /org/SubA or a link to aspect /sys/Arch are forwarded to node 102-4, and all fragments 164 stored in node 102-7 with a link to any aspect are forwarded to node 102-8.

Figure 9:
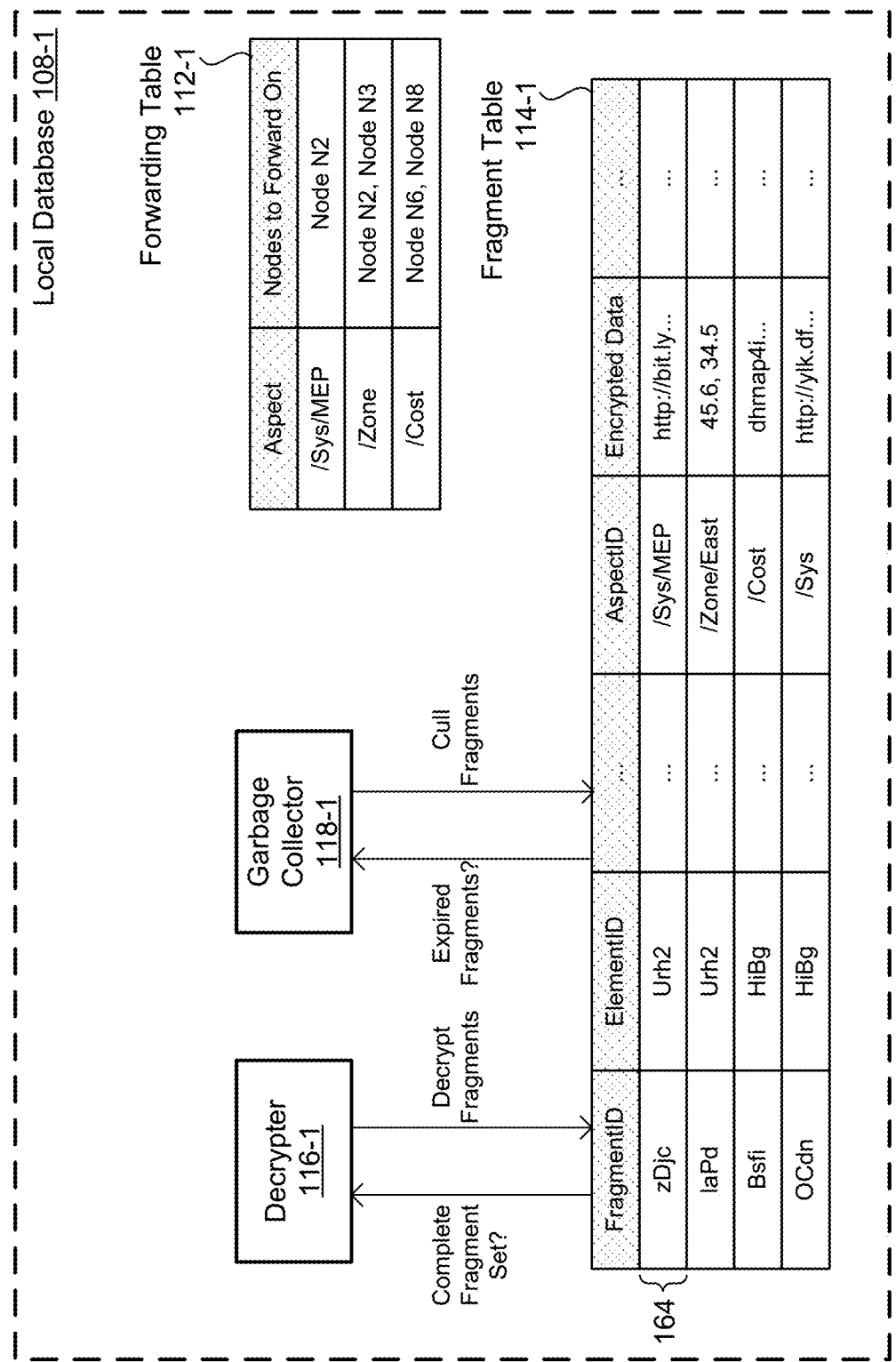
FIG. 9 illustrates an example of a local database, according to some embodiments of the present disclosure.

FIG. 9 illustrates an example of local database 108-1, according to some embodiments of the present disclosure. The forwarding rules for node 102-1 are stored in forwarding table 112-1. In the specific example shown in FIG. 9, node N2 has permission to access aspects /Sys/MEP and /Zone. Accordingly, because fragment zDjc is linked to aspect /Sys/MEP (which directly matches with aspect /Sys/MEP listed in the forwarding rules), either fragment zDjc or a copy of fragment zDjc is sent to node N2. Also, because fragment laPd is linked to aspect /Zone/East (which is a nested aspect of parent aspect /Zone), either fragment laPd or a copy of fragment laPd is sent to node N2. However, because fragment OCdn is linked to aspect /Sys (which is a parent aspect of nested aspect /Sys/MEP), it is not sent to node N2 because node N2 does not have permission to access it.

In some embodiments, local database 108-1 includes a decrypter 116-1 which periodically determines whether all fragments 164 of data element 160 are stored in fragment table 114-1. If it determines that all fragments 164 are stored (i.e., that the fragment set is complete), then decrypter 116-1 decrypts the fragments by overwriting the fragments with their decrypted equivalents. Fragments 164 are encrypted in such a way that decryption is only possible where each of the decrypted fragments 164 are available and decrypted simultaneously. In some embodiments in which fragments 164 have been encrypted using Shamir Secret Sharing encryption, decrypter 116-1 may use Shamir Secret Sharing decryption to decrypt fragments 164. Once fragments 164 are decrypted, data element 160 may be accessible to local queries (queries by other nodes 102).

In some embodiments, local database 108-1 includes a garbage collector 118-1 which culls all encrypted fragments 164 whose expiration timestamp field has run over a predetermined threshold. This process allows node 102-1 to run efficiently by removing fragments 164 that were received by node 102-1 but that do not form a complete data element 160. Since not all of fragments 164 are available, node 102-1 is unable to decrypt such incomplete fragments 164 which may be occupying valuable memory within local database 108-1.

FIG. 10 illustrates an example of fragment table 114-1, according to some embodiments of the present disclosure. The top two rows of fragment table 114-1 identify the type of information contained in each column of fragment table 114-1. The remaining rows each identify a different fragment 164 that is stored in the table. The column labeled "FragmentID" corresponds to a unique identifier of fragment 164, expressed as a string. The column labeled "ElementID" corresponds to an identifier of data element 160 to which fragment 164 belongs, expressed as a string. In some embodiments, data elements can be "revised" by committing them over external interface 104-1 with an already existing ElementId. In this case, the data elements are grouped by ElementID, and sorted chronologically by timestamp. FragmentIDs and AspectIDs work to differentiate fragments across revisions.

The column labeled "Rank" corresponds to the number of aspects 150 in data element 160 to which fragment 164 belongs, expressed as an integer. In some embodiments, the number of aspects 150 is equal to the number of fragments 164 in data element 160. The column labeled "Expiration" includes a time stamp at which fragment 164 is to be deleted. In some embodiments, the time stamp at which fragment 164 is to be deleted is based on the time at which fragment 164 was stored in local database 108-1. In some embodiments, the time stamp is deleted once fragment 164 is decrypted. In some embodiments, "deleted" data elements are by default only marked as deleted, and flagged as such on fragments 164 as they are moved around distributed database 100. In such embodiments, each individual node has discretion as to whether a particular data element will actually be deleted.

The column labeled "AspectID" corresponds to an identifier of aspect 105 to which fragment 164 is linked. The column labeled "Encrypted Data" includes the data payload of fragment 164, generally expressed as a string. The column labeled "Node" corresponds to an identifier of the node 102 at which fragment 164 was produced, expressed as a string. The column labeled "Timestamp" includes a time stamp at which fragment 164 was created or received by node 102-1. The column labeled "Decrypted?" corresponds to whether fragment 164 has been reconstructed, i.e., decrypted, expressed as a Boolean. The column labeled "Forwarded?" corresponds to whether fragment 164 has been forwarded to other nodes 102 in accordance with the forwarding rules in forwarding table 112-1.

Figure 11:
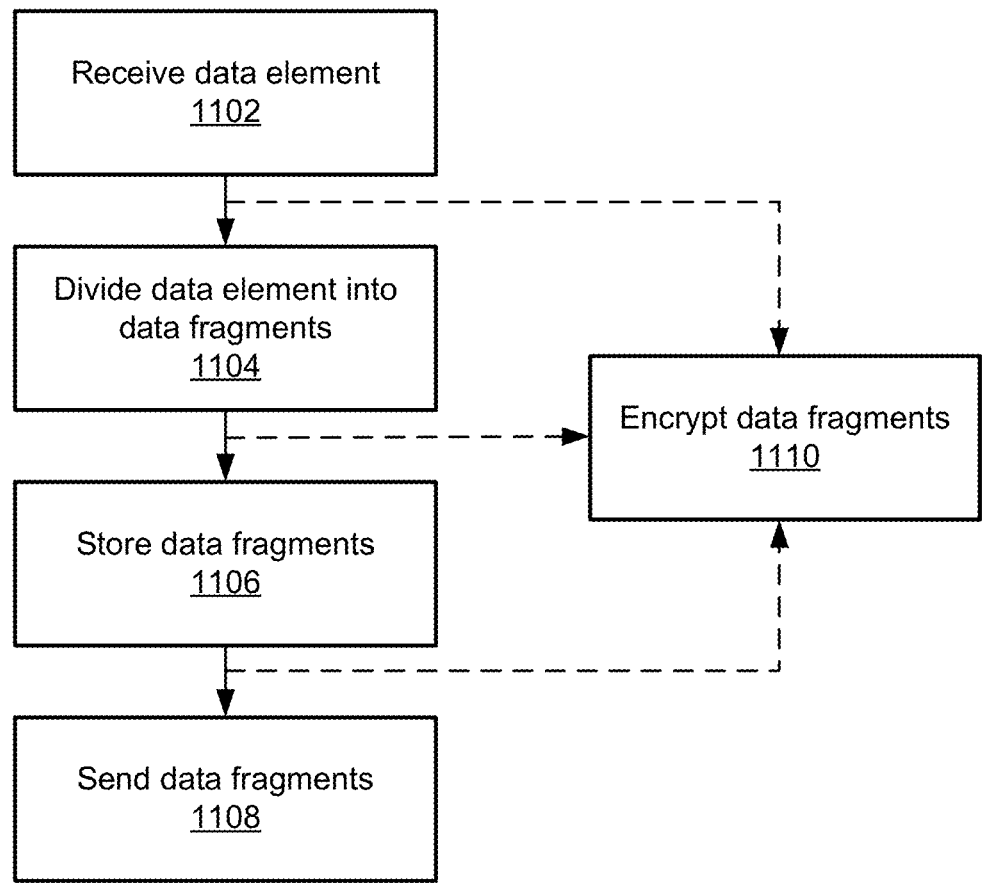
FIG. 11 illustrates a flowchart of a method of processing data within a distributed database, according to some embodiments of the present disclosure.

FIG. 11 illustrates a flowchart of a method 1100 of processing data within distributed database 100, according to some embodiments of the present disclosure. Steps of method 1100 need not be performed in the order shown, and not all steps of method 1100 need be performed during performance of method 1100.

At step 1102, data element 160 is received by external interface 104 within node 102. Data element 160 may include one or more data fragments 164. Each of data fragments 164 may be linked to a single aspect of a plurality of aspects 150. In some embodiments, links 162 to aspects 150 may be determined by analyzing the data contained in data element 160. For example, data element 160 may include a header that identifies each data fragment 164 contained in data element 160 and the single aspect corresponding to each fragment. In some embodiments, each data fragment 164 may include a header that identifies the single aspect. In some embodiments, each of the plurality of aspects 150 may be a header aspect 152 and/or a nested aspect 154. A particular nested aspect 154 may include a greater level of specificity than a corresponding parent aspect 152 such that the number of nodes 102 that are permitted to access the particular nested aspect 154 is less than or equal to the number of nodes 102 that are permitted to access the corresponding parent aspect 152. In some embodiments, data element 160 is received from a data source external to distributed database 100. In some embodiments, the data source may be one or more accessing entities 110, which may include a user, a device, or a software process.

At step 1104, data element 160 is divided into data fragments 164 by external interface 104. In some embodiments, dividing data element 160 into data fragments 164 may include locating a table within data element 160 and separating different rows (or columns) of the table, causing the different rows (or the different columns) to become separate pieces of data. For example, in some embodiments data element 160 includes a table with different rows corresponding to different data fragments 164. After data element 160 is divided into data fragments 164, the different data fragments 164 may be moved between different components of distributed database 100 independent of each other.

At step 1106, data fragments 164 are stored by local database 108. Storing data fragments 164 by local database 108 may include receiving, by local database 108, data fragments 164 from external interface 104. In some embodiments, data fragments 164 corresponding to data element 160 may be stored within local database 108 in close proximity to each other in memory. In other embodiments, data fragments 164 corresponding to data element 160 may be stored at random or arbitrary locations in memory. In some embodiments, data fragments 164 are stored in a fragment table 114 within local database 108. In some embodiments, data fragments 164 are stored based on the single aspect they are linked to. For example, data fragments 164 having a link to a first aspect may be stored in close proximity to each other in memory, and data fragments 164 having a link to a second aspect may be stored in close proximity to each other in memory.

At step 1108, data fragments 164 are sent (i.e., forwarded) by internal interface 106 to a destination node 102. In some embodiments, internal interface 106 may access forwarding table 112 within local database 108 which may contain information identifying the destination node 102 based on the plurality of aspects 150. For example, data fragments 164 having a link to a first aspect may be sent to a first destination node, and data fragments 164 having a link to a second aspect may be send to a second destination node. Continuing with the example, data fragments 164 having a link to a third aspect may be sent to the first destination node and/or the second destination node. Internal interface 106 may send data fragments 164 to the destination node 102 via a wired or wireless connection.

At step 1110, data fragments 164 are encrypted by external interface 104 or internal interface 106. Step 1110 may be performed between steps 1102 and 1104, between steps 1104 and 1106, or between steps 1106 and 1108, depending on the particular embodiment. In some embodiments, step 1110 may be performed concurrently with any of steps 1102-1108. In one particular implementation, external interface 104 may encrypt the one or more data fragments 164 to generate one or more encrypted data fragments 164 such that decryption of the encrypted data fragments 164 can only be performed using all of the encrypted data fragments 164 and not a subset of the encrypted data fragments 164. Subsequent to the encryption, local database 108 may store the encrypted data fragments 164 and internal interface 106 may send the encrypted data fragments 164 to the destination node 102.

In some embodiments, a process may encrypt data fragments 164 after they are stored in local database 108. In other embodiments, internal interface 106 may encrypt data fragments 164 to generate encrypted data fragments 164 such that decryption of the encrypted data fragments 164 can only be performed using all of the encrypted data fragments 164 but cannot be performed using a subset of the one or more encrypted data fragments 164. Subsequent to the encryption, internal interface 106 may send the one or more encrypted data fragments 164 to the destination node 102.

Figure 12:
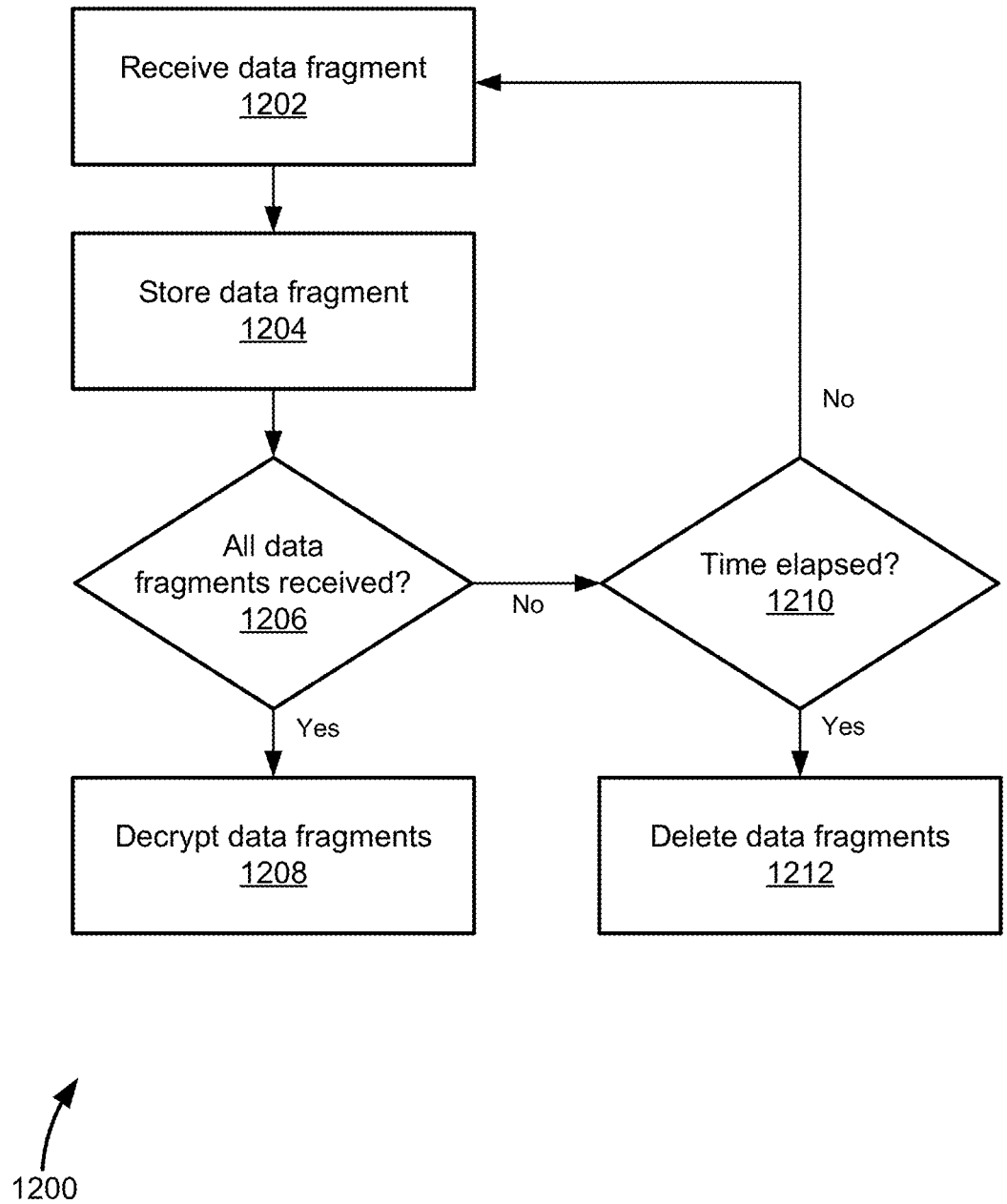
FIG. 12 illustrates a flowchart of a method of processing data within a distributed database, according to some embodiments of the present disclosure.

FIG. 12 illustrates a flowchart of a method 1200 of processing data within distributed database 100, according to some embodiments of the present disclosure. Steps of method 1200 need not be performed in the order shown, and not all steps of method 1200 need be performed during performance of method 1200.

At step 1202, a first data fragment 164 of data element 160 is received by internal interface 106. In some embodiments, the first data fragment 164 is received from a source node 102 within distributed database 100. In some embodiments, the first data fragment 164 of data element 160 may be received concurrently with a second data fragment 164 of data element 160. In other embodiments, the first data fragment 164 is received prior to the second data fragment 164. In some embodiments, the first data fragment 164 was previously encrypted by the source node 102 or by some other component within distributed database 100 prior to performance of step 1202.

At step 1204, the first data fragment 164 is stored by local database 108. Storing the first data fragment 164 by local database 108 may include receiving, by local database 108, the first data fragment 164 from internal interface 106. In some embodiments, the first data fragment 164 may be stored in local database 108 in close proximity in memory to other received data fragments 164. In other embodiments, received data fragments 164 may be stored at random or arbitrary locations in memory. In embodiments in which received data fragments 164 are encrypted, a portion of the data within said received data fragments 164 that identify data element 160 and the number of fragments in data element 160 (or the number of linked aspects) may be unencrypted and therefore readable by local database 108. In some embodiments, the first data fragment 164 is stored in fragment table 114 within local database 108.

At step 1206, it is determined whether all data fragments 164 of data element 160 have been received. In some embodiments, decrypter 116 may periodically (or each time a fragment is received) determine whether all data fragments 164 of data element 160 have been received. This may be accomplished by analyzing an unencrypted portion of received data fragments 164 that identify data element 160 and the number of fragments in data element 160 (or the number of linked aspects). By way of example, the first data fragment 164 may include unencrypted data that indicates that there are five data fragments 164 in data element 160. Continuing with the example, if decrypter 116 determines that five data fragments 164 in data element 160 are currently stored in local database 108, then it may determine that all data fragments 164 of data element 160 have been received. If it is determined that all data fragments 164 of data element 160 have been received, then method 1200 proceeds to step 1208. Otherwise, method 1200 proceeds to step 1210.

At step 1208, all data fragments 164 of data element 160 are decrypted. When data fragments 164 are decrypted, they may be overwritten and replaced with their decrypted equivalents. In one particular implementation, decrypter 116 uses Shamir Secret Sharing decryption to decrypt fragments 164. Once data fragments 164 have been decrypted, they may be marked within local database 108 as having been decrypted (as explained in reference to FIG. 10).

At step 1210, it is determined whether a time associated with one or more of the received data fragments 164 has elapsed. Determining whether a time associated with a data fragment 164 has elapsed may include comparing the total time the data fragment has been stored in local database 108 to a threshold or to some absolute time such as a UTC value (e.g., a particular fragment may be set to be deleted after Dec. 25, 2018 at 12:00 AM PDT). In some embodiments, the threshold may be based on the expected time it takes for data to be transmitted between nodes 102 of distributed database 100. In various embodiments, the threshold may be 1 second, 1 minute, 1 hour, or 1 day, among other possibilities. If it is determined that the time associated with one or more of the received data fragments 164 has elapsed, then method 1200 proceeds to step 1212. Otherwise, method 1200 proceeds to step 1202, where a second data fragment 164 of data element 160 is received by internal interface 106, and the steps are repeated as indicated in FIG. 12.

At step 1212, the received data fragments 164 for which the time elapsed is/are deleted. In some embodiments, only the data fragments 164 with an elapsed time are deleted. In other embodiments, all of the data fragments 164 associated with data element 160 are deleted. For example, if the time associated with the first data fragment 164 has elapsed prior to decryption of the first data fragment 164, then other any other received data fragments 164 corresponding to the same data element 160 may also be deleted along with the first data fragment 164.

Figure 13:
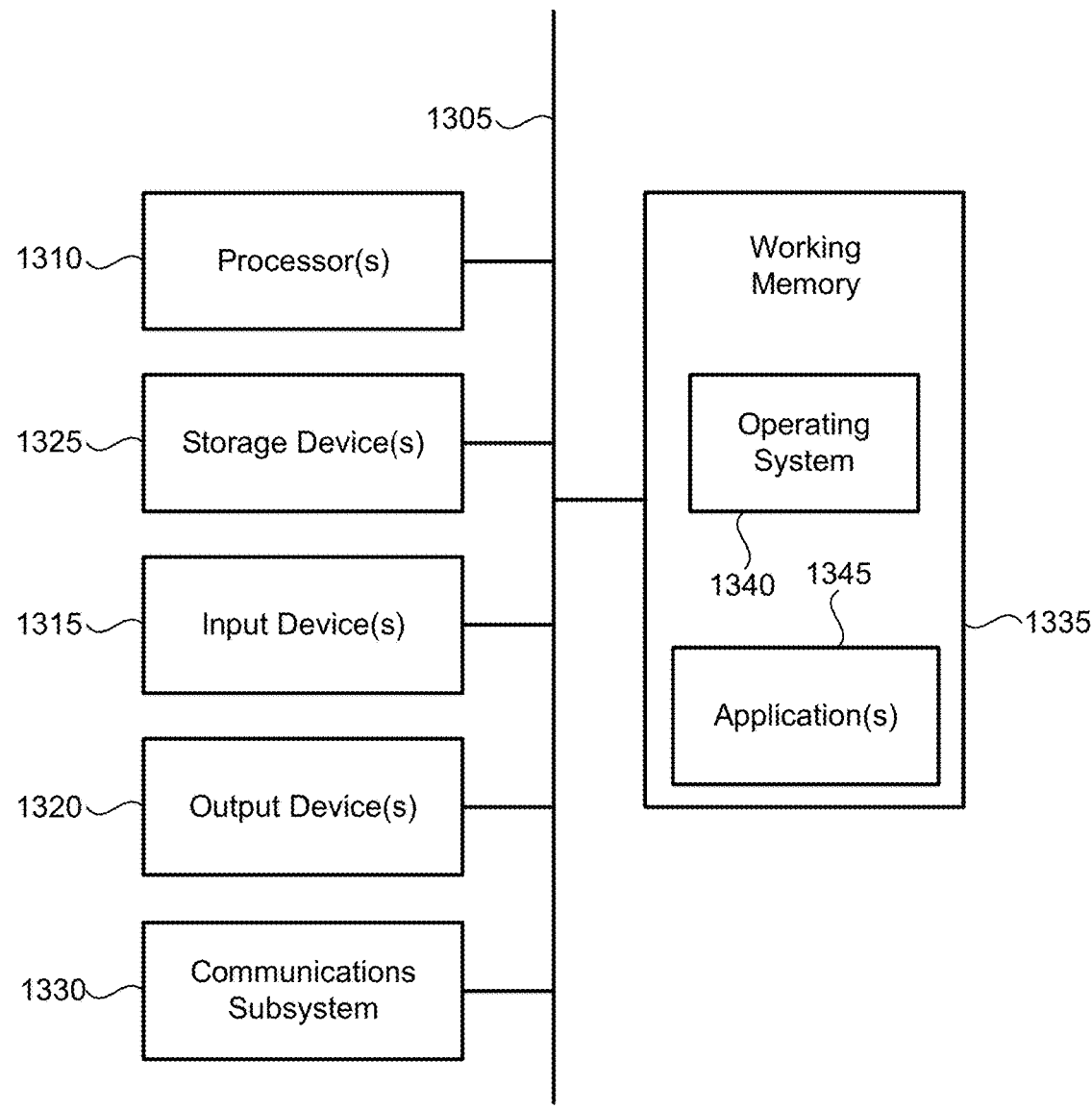
FIG. 13 illustrates a simplified computer system, according to an embodiment of the present disclosure.

FIG. 13 illustrates a simplified computer system, according to an embodiment of the present disclosure. Computer system 1300 as illustrated in FIG. 13 may be incorporated into devices such as node 102, external interface 104, internal interface 106, local database 108, or some other device described herein. FIG. 13 provides a schematic illustration of one embodiment of a computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include, without limitation a mouse, a keyboard, a camera, and/or the like; and one or more output devices 1320, which can include, without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1330, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1330 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into Computer system 1300, e.g., an electronic device as an input device 1315. In some embodiments, Computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by Computer system 1300 and/or might take the form of source and/or installable code, which, upon compilation and/or installation on Computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as Computer system 1300 to perform methods in accordance with various embodiments of the technology. According to a set of embodiments, some or all of the procedures of such methods are performed by Computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using Computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by Computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A distributed database comprising: a plurality of nodes, wherein each node of the plurality of nodes includes:
    an external interface to:
    receive a data element from a data source external to the distributed database, wherein the data element includes one or more data fragments, wherein each of the one or more data fragments is linked to a single aspect of a plurality of aspects, wherein each of the plurality of aspects is either a parent aspect or a nested aspect, wherein a particular nested aspect includes a greater level of specificity than a corresponding parent aspect; and
    divide the data element into the one or more data fragments; a local database to:
    store the one or more data fragments; and
    store a forwarding table that contains information identifying a destination node of the plurality of nodes to which the one or more data fragments are to be forwarded based on the single aspect; and
an internal interface to:
access the forwarding table based on the single aspect to determine the destination node;
encrypt the one or more data fragments to generate one or more encrypted data fragments such that decryption of the one or more encrypted data fragments is performed using all of the one or more encrypted data fragments and not a subset of the one or more encrypted data fragments; and
send the one or more encrypted data fragments to the destination node.

2. The distributed database of claim 1, wherein: the internal interface is further to receive one or more second encrypted data fragments from a source node of the plurality of nodes; and the local database is further to store the one or more second encrypted data fragments.

3. A node within a distributed database, the node comprising: an external interface to:
receive a data element from a data source external to the distributed database, wherein the data element includes one or more data fragments, wherein each of the one or more data fragments is linked to a single aspect of a plurality of aspects, wherein each of the plurality of aspects is either a parent aspect or a nested aspect, wherein a particular nested aspect includes a greater level of specificity than a corresponding parent aspect; and
divide the data element into the one or more data fragments;
a local database to:
store the one or more data fragments; and
store a forwarding table that contains information identifying a destination node within the distributed database to which the one or more data fragments are to be forwarded based on the single aspect; and
an internal interface to:
access the forwarding table based on the single aspect to determine the destination node;
encrypt the one or more data fragments to generate one or more encrypted data fragments such that decryption of the one or more encrypted data fragments is performed using all of the one or more encrypted data fragments and not a subset of the one or more encrypted data fragments; and
send the one or more encrypted data fragments to the destination node.

4. The node of claim 3, wherein: the internal interface is further to receive one or more second encrypted data fragments from a source node within the distributed database; and the local database is further to store the one or more second encrypted data fragments.

5. The node of claim 4, wherein the local database is further configured to:
periodically determine whether all of the one or more second encrypted data fragments have been stored; and
in response to determining that all of the one or more second encrypted data fragments have been stored, decrypting the one or more second encrypted data fragments.

6. The node of claim 3, wherein the local database includes:
a fragment table for storing the one or more data fragments.

7. The node of claim 3, wherein the data source is one or more of:
a user;
a device; and
a software process.

8. The node of claim 3, wherein the external interface and the internal interface utilize a same processor.

9. A method of processing data within a distributed database, the method comprising:
receiving, by an external interface of a node within the distributed database, a data element from a data source external to the distributed database, wherein the data element includes one or more data fragments, wherein each of the one or more data fragments is linked to a single aspect of a plurality of aspects, wherein each of the plurality of aspects is either a parent aspect or a nested aspect, wherein a particular nested aspect includes a greater level of specificity than a corresponding parent aspect;
dividing, by the external interface, the data element into the one or more data fragments;
storing, by a local database of the node, the one or more data fragments;
storing, by the local database, a forwarding table that contains information identifying a destination node within the distributed database to which the one or more data fragments are to be forwarded based on the single aspect;
access, by an internal interface of the node, the forwarding table based on the single aspect to determine the destination node;
encrypting, by the internal interface, the one or more data fragments to generate one or more encrypted data fragments such that decryption of the one or more encrypted data fragments is performed using all of the one or more encrypted data fragments and not a subset of the one or more encrypted data fragments; and
sending, by the internal interface of the node, the one or more encrypted data fragments to the destination node.

10. The method of claim 9, further comprising:
receiving, by the internal interface, one or more second encrypted data fragments from a source node within the distributed database; and
storing, by the local database, the one or more second encrypted data fragments.

11. The method of claim 10, further comprising:
periodically determining, by the local database, whether all of the one or more second encrypted data fragments have been stored; and
in response to determining that all of the one or more second encrypted data fragments have been stored, decrypting, by the local database, the one or more second encrypted data fragments.

12. The method of claim 9, wherein the local database includes:
a fragment table for storing the one or more data fragments.

13. The method of claim 9, wherein the data source is one or more of:
a user;
a device; and
a software process.

14. The method of claim 9, wherein the external interface and the internal interface utilize a same processor.

* * * * *